US012386082B2

(12) United States Patent
Liu et al.

(10) Patent No.: US 12,386,082 B2
(45) Date of Patent: Aug. 12, 2025

(54) GNSS-BASED REAL-TIME HIGH-PRECISION WAVE MEASUREMENT METHOD AND APPARATUS

(71) Applicant: FIRST INSTITUTE OF OCEANOGRAPHY, MINISTRY OF NATURAL RESOURCES, Shandong (CN)

(72) Inventors: Yang Liu, Qingdao (CN); Menghao Li, Qingdao (CN); Fangli Qiao, Qingdao (CN); Li Tian, Qingdao (CN); Guanxu Chen, Qingdao (CN); Yanxiong Liu, Qingdao (CN)

(73) Assignee: FIRST INSTITUTE OF OCEANOGRAPHY, MINISTRY OF NATURAL RESOURCES, Qingdao (CN)

( * ) Notice: Subject to any disclaimer, the term of this patent is extended or adjusted under 35 U.S.C. 154(b) by 283 days.

(21) Appl. No.: 18/015,483

(22) PCT Filed: Sep. 30, 2020

(86) PCT No.: PCT/CN2020/119190
§ 371 (c)(1),
(2) Date: Jan. 10, 2023

(87) PCT Pub. No.: WO2022/007211
PCT Pub. Date: Jan. 13, 2022

(65) Prior Publication Data
US 2023/0288578 A1 Sep. 14, 2023

(30) Foreign Application Priority Data
Jul. 10, 2020 (CN) .......................... 202010666656.2

(51) Int. Cl.
*G01S 19/44* (2010.01)
*G01C 13/00* (2006.01)
*G01S 19/40* (2010.01)

(52) U.S. Cl.
CPC ............ *G01S 19/44* (2013.01); *G01C 13/004* (2013.01); *G01S 19/40* (2013.01)

(58) Field of Classification Search
CPC ........ G01S 19/44; G01S 19/40; G01C 13/004
(Continued)

(56) References Cited

FOREIGN PATENT DOCUMENTS

| CN | 103616711 A | 3/2014 |
|----|-------------|--------|
| CN | 102829770 B | 5/2015 |

(Continued)

OTHER PUBLICATIONS

Shan Rui et al., "Feasibility study of using GPS absolute velocity estimation to measure wave", Marine Science Bulletin vol. 30, Issue 5, (2011), pp. 529-534.
(Continued)

*Primary Examiner* — Harry K Liu
(74) *Attorney, Agent, or Firm* — Oliff PLC

(57) ABSTRACT

A new GNSS-based real-time high-precision wave measurement method, wherein the GNSS phase, pseudo-range, Doppler frequency shift observations and broadcast ephemerides are collected by a GNSS receiver, and antenna carried by a sea surface carrier; the three-dimensional speeds of a carrier are acquired using an epoch difference of phase observations; and wave element information are then solved. The wave element information can also be obtained by integrating the speeds for a certain duration and removing a linear trend term to obtain a time-dependent displacement variations. No additional precise differential correction is needed, thereby saving on service costs and communication costs of precise differential corrections. High-precision
(Continued)

wave element information is obtained in real time, and locally stored in a buoy or periodically returned by communication, thereby expanding the working range of GNSS-based ocean wave measurement.

10 Claims, 2 Drawing Sheets

(58) Field of Classification Search
USPC .................................................. 342/357.27
See application file for complete search history.

(56) References Cited

FOREIGN PATENT DOCUMENTS

| CN | 204612705 U | * | 9/2015 |
|---|---|---|---|
| CN | 106840113 A | | 6/2017 |
| CN | 105182369 B | | 7/2018 |
| CN | 109521445 A | * | 3/2019 |
| CN | 106291639 B | | 11/2019 |

OTHER PUBLICATIONS

Wang Junjie et al., "GPS Wave Measurement Method Based on TRACK", Journal of Geodesy and Geodynamics vol. 35, No. 5, (2015), pp. 768-770.

Liu Guodong, "Design of Wave Buoy System and Research on Wave Measurement Methods", Science Technology and Engineering vol. 11, No. 35, (2011), pp. 8805-8809.

Mar. 30, 2021 International Search Report issued in International Patent Application No. PCT/CN2020/119190.

Mar. 30, 2021 Written Opinion issued in International Patent Application No. PCT/CN2020/119190.

* cited by examiner

GNSS-BASED REAL-TIME HIGH-PRECISION WAVE MEASUREMENT METHOD AND APPARATUS

TECHNICAL FIELD

This patent belongs to the field of marine environmental monitoring, and relates to a GNSS-based real-time high-precision wave measurement method which is applicable to all water environment scenarios such as lakes, rivers, oceans and the like, especially to far-sea scenarios.

BACKGROUND

The wave is an important motion phenomenon in the ocean, so to monitor the changes of waves and study their laws is of great significance to human activities at sea and disaster reduction and prevention. In recent decades, with the continuous increasing of human exploitations to the ocean, the research on marine observation methods and the development of instruments and equipment have been greatly promoted. At present, there have been a variety of wave measuring instruments: an acceleration-type wave gauge, a pressure-type wave gauge, an acoustic wave gauge and a GNSS wave measuring buoy, etc. Among them, the GNSS wave measuring buoy acquires three-dimensional spatial position and time information of a buoy carrier by use of a global navigation satellite system (GNSS), and the GNSS wave measuring buoy has a good wave-following motion characteristic, so it can effectively inverse wave elements through the position information. The GNSS wave measuring buoy may effectively observe wave information in combination with existing GNSS technologies, and has the advantages of simple system, low cost and small size, etc. Due to the limitations of GNSS technologies, for example, a centimeter-level positioning result may be obtained by using the RTK (Real-Time Kinematic) technology or the PPK (Post-Processing Kinematic) technology, but these methods are implemented dependent on base stations, and their effective operating distances are limited within dozens of kilometers offshore, thus, these methods may not be applied to far-sea scenarios; and the PPP (Precise Point Positioning) technology has no distance limitation, and there is no need to acquire data from one or more close base stations. The precision of the satellite orbits and clock offsets product is one of the most important factors affecting the positioning precision of PPP. High-precision PPP is dependent on high-precision GNSS satellite orbits and clock offsets correction products, and a real-time high-precision PPP method needs extra real-time precise differential correction products, thus greatly increasing the service cost and the communication cost required by precise differential correction, and moreover, such real-time products generally have time delay and precision decline, which reduces the application precision in real-time scenarios.

In summary, the traditional GNSS-based wave measurement mainly has the following disadvantages:

(1) if a real-time centimeter-level measurement precision is to be achieved, the GNSS observations of a wave buoy is required to be returned to a data processing center for real-time calculation, to do this, a large amount of communication bandwidths is required, thereby generating a communication cost, especially a far-sea satellite communication cost, and reducing a real-time performance due to communication; and if the GNSS observations of the wave buoy is real-time processed locally in the buoy, an additional differential correction service is required, wherein in offshore scenarios, the differential correction service is required to be obtained by means of communication with the land, and in far-sea scenarios, the differential correction service is required to be obtained from a communication satellite, thereby increasing a cost of purchasing the differential correction services and a communication cost.

(2) If a post-processed centimeter-level measurement precision is to be achieved, GNSS observation data of a wave buoy is required to be returned to the data processing center for post-processing, to do this, a large amount of communication bandwidths is needed, so that a communication cost, especially a far-sea satellite communication cost, is generated; and if the GNSS data is read for calculation after the wave buoy is recovered, on one hand, a cost of the recovery operation is increased and the automation is poor, and on the other hand, a cost of storing a large amount of GNSS data in the wave buoy is also increased.

From the above analysis, it is not difficult to understand that current traditional GNSS wave measurement methods have great disadvantages and limitations in real-time high-precision wave measurement. With the continuous development of the GNSS technologies, the breakthrough of real-time high-precision wave measurement methods is a core for improving the time-effectiveness of real-time measurement of ocean wave services and the wave inversion precision, and may directly provide a technical support for the inversion of global ocean wave element information.

SUMMARY

In order to overcome the defects in the above-mentioned technologies, the present invention provides a GNSS-based real-time high-precision wave measurement method applicable to offshore and far-sea scenarios, in which only a GNSS receiver (or GNSS board) is required to be carried, real-time high-precision centimeter-level wave measurement results and real-time buoy positions with at least meter-level precision can be obtained directly based on the broadcast ephemeris freely disseminated and used by GNSS satellites without additional precise differential correction services and communication thereof; and wave element information such as wave height, period, wave direction and the like may be stored locally in a buoy or returned by means of communication, so the costs of precise differential correction services, communication and storage can be saved.

The objective of the present invention is achieved by means of the following technical solution:

1. A GNSS-based real-time high-precision wave measurement method, comprising the following steps:
   (1) constituting a wave measurement apparatus by using a sea surface carrier such as a wave buoy that carries a GNSS, collecting high-frequency GNSS positioning electromagnetic wave signals in real time, converting the high-frequency GNSS positioning electromagnetic wave signals into phases, pseudo-ranges, Doppler frequency shift observations and broadcast ephemerides and sending them to a processor of the wave measurement apparatus;
   (2) solving horizontal and vertical three-dimensional motion speeds of the sea surface carrier such as a buoy and the like in real time by use of an established phase observation epoch differential equation using the broadcast ephemeris and in consideration with the processing of error terms;
   (3) repeating steps (1)-(2) for 10 to 20 minutes to reach a certain amount of data until the initialization of wave measurement is completed;

(4) solving the horizontal and vertical three-dimensional motion speeds of the sea surface carrier at each epoch in real time, repeating steps (1)-(3) by using a sliding time window method to integrate the vertical motion speed for 10-30 minutes and remove a trend term caused by the system error and tide so as to obtain time-dependent vertical displacement change information, and then solving wave element information such as the wave height and the wave period; alternatively, calculating the cross spectrum by means of the cross-correlation function through solved vertical, east-west and north-south speeds of the wave measurement apparatus, followed by solving the direction spectrum and the frequency spectrum by means of the direction spectrum analysis method, and then solving the wave height, the period and the wave direction; and (5) locally storing the wave element information during these sliding time window periods, that is calculated in real time, in a buoy, or periodically returning the wave element information by means of real-time communication. The GNSS in the present invention includes global navigation satellite systems such as BDS (Bei-Dou Navigation Satellite System), GPS (Global Positioning System), GLONASS, Galileo, etc., and also includes regional navigation satellite systems such as QZSS (Quasi Zenith Satellite System) and NAVIC, etc. The GNSS phases, the pseudo-ranges, the Doppler frequency shift observations and the GNSS broadcast ephemerides are collected by a GNSS signal acquisition module carried by a sea surface carrier such as a wave buoy and the like, step (5) includes that vertical, east-west and north-south speeds of a carrier such as a buoy and the like are determined by using a phase observation epoch differential equation using GNSS broadcast ephemerides, the time-dependent vertical displacement change is obtained by integrating the vertical speeds and removing a trend term, and then high-precision element information such as the wave height and the wave period is inversed in real time based on the vertical displacement; alternatively, the direction spectrum and the frequency spectrum of the wave are solved by the vertical, east-west and north-south speeds measured by a GNSS, and then wave element information such as the wave height, the period and the wave direction and the like is solved. The present invention puts forward that in a wave measurement, a three-dimensional speed is determined by performing epoch difference of phase observations directly based on GNSS broadcast ephemerides, and no additional precise differential correction is needed, thereby saving on service costs and communication costs of precise differential corrections of the GNSS-based wave measurement apparatus; the present invention is applicable to offshore and far-sea scenarios, and wave element information is directly obtained in real time, and locally stored in a buoy or periodically returned by means of communication, so GNSS original observation data is not required to be stored, no GNSS original observation data is required to be transmitted by communication, and precise differential correction and real-time communication thereof are not required, thereby overcoming the shortcomings of existing GNSS wave measurement methods that precise differential correction and real-time communication are required, and expanding the working range of low-cost GNSS-based ocean wave measurement; and the sea surface carrier such as a buoy and the like according to the present invention may carry a low-cost single-frequency GNSS receiver to obtain real-time high-precision wave measurement results, thus, the present invention has a high practical application value.

GNSS satellite-based augmentation services, satellite-based differential services, precision positioning services, etc. that may be free in the future may also be used to obtain real-time high-precision centimeter-level wave measurement results and real-time buoy positions with at least meter-level precision.

In step (2) of solving three-dimensional speeds by use of an established phase observation epoch differential equation using the broadcast ephemeris, a carrier phase observation epoch differential equation using the broadcast ephemeris is shown in Equation (1), and an equation for solving the three-dimensional speeds is shown in Equation (2):

$$[\lambda \Delta \Phi_{r,i}^S]_{L1,L2} = (e_{r,i+1}^S \cdot \Delta \xi_{r,i} + c\Delta \delta t_{r,i}) - (c\Delta \delta t_i^S)_{BRD} + \Delta p_{r,i}^S + \Delta \varepsilon_{r,i}^S \quad (1)$$

$$V_i = \frac{\Delta \xi_{r,i}}{\Delta t_i} \quad (2)$$

where, in Equation (1), $\lambda$ is the wave length of the carrier frequency (L1 or L2), $\Delta \Phi_{r,i}^S$ is a difference of carrier phase observations between adjacent epochs (i, i+1) from a satellite s to a receiver r, and i is an epoch number; $e_{r,i+1}^S$ is a unit vector at the (i+1)th epoch from the satellite s to the receiver r, and $\Delta \xi_{r,i}$ is a difference of receiver position correction between adjacent epochs (i, i+1); c is a speed of light, and $\Delta \delta t_{r,i}$ and $\delta t_i^S$ are respectively the relative receiver clock offsetoffset and satellite clock offsetoffset calculated by a broadcast ephemeris between adjacent epochs (i, i+1); $\Delta p_{r,i}^S$ is a comprehensive error correction between adjacent epochs (i, i+1), including a satellite orbit correction, an ionosphere correction, a troposphere correction, a phase variation error correction, a relativistic effect correction and an earth rotation effect correction, where the satellite orbit correction is calculated by a broadcast ephemeris, the ionosphere correction is calculated by a dual-frequency ionospheric-free combined first-order term or an ionospheric model disseminated by a broadcast ephemeris, the troposphere correction is calculated by actually measured or numerically modeled meteorological data and a mapping function, and the phase variation error correction, the relativistic effect correction and the earth rotation effect correction are calculated by corresponding models; $\Delta \varepsilon_{r,i}^S$ is other residual error terms and noise; estimated parameters in Equation (1) are $\Delta \xi_{r,i}$ and $\Delta \delta t_{r,i}$; in Equation (2), $V_i$ is a three-dimensional speed, $\Delta \xi_{r,i}$ is a difference of receiver position correction between adjacent epochs (i,i+1), and $\Delta t_i$ is a time interval between adjacent epochs; and according to the invention, when frequent cycle slips occur in GNSS phase observations, the three-dimensional speeds of the wave measurement apparatus are calculated by using Doppler frequency shift observations to supplement a time series of the three-dimensional speeds.

The wave element information such as the wave height and the wave period in step (4) can be obtained on the basis of the vertical displacement with after removing a trend term so as to obtain the wave heights and corresponding periods thereof, specifically including a maximum wave height and a corresponding period thereof, a one-tenth wave height and a corresponding period thereof, a significant wave height and a corresponding period thereof, and an average wave height and corresponding period thereof; and the wave element information such as wave heights, wave periods and wave directions in step (4) also can be obtained by solving the direction spectrum and the frequency spectrum of the wave based on vertical, east-west and north-south speeds and then solving the element information such as wave heights, wave periods and wave directions. The wave element information can be inversed by using a spectrum analyzing method according to the formulas as follows:

$$[\lambda \Delta \Phi_{r,i}^S]_{L1,L2} = [\lambda \Phi_{r,i+1}^S]_{L1,L2} - [\lambda \Phi_{r,i}^S]_{L1,L2} \quad (7)$$

$$= (e_{r,i+1}^S \cdot (\delta \xi_{r,i-1} - \delta \xi_{r,i}) + (e_{r,i+1}^S - e_{r,i}^S) \cdot \delta \xi_{r,i} + c\Delta \delta t_{r,i}) - (c\Delta \delta t_i^S)_{BRD} + \Delta p_{r,i}^S + \Delta \varepsilon_i$$

$$\approx (e_{r,i+1}^S \cdot (\delta \xi_{r,i-1} - \delta \xi_{r,1}) + c\Delta \delta t_{r,i}) - (c\Delta \delta t_i^S)_{BRD} + \Delta p_{r,i}^S + \Delta \varepsilon_i$$

$$m_n = \int_0^x f^n S(f) df, \; n = 0, 1, 2 \quad (3)$$

$$H_{m0} = 4.005\sqrt{m_0} \quad (4)$$

$$T_z = 2\pi\sqrt{m_0/m_2} \quad (5)$$

where f is the frequency, S(f) is the power spectral density, $m_n$ is the n-order spectrum moment, $H_{m0}$ is the significant wave height obtained by the frequency spectrum, and $T_Z$ is the average period;

a three-dimensional speed of a motion carrier is acquired by use of the GNSS phase observation epoch differential equation and the GNSS broadcast ephemeris, a time-dependent vertical displacement change is obtained by integrating the vertical speeds and removing a trend term, and then high-precision element information such as wave heights and wave periods is inversed in real time according to the vertical displacement; element information such as the direction spectrum and the frequency spectrum of the wave is solved by vertical, east-west and north-south speeds measured by GNSS, and then high-precision element information such as wave heights, wave periods and wave directions is inversed in real time; the above process is specifically divided into the following three parts, described as the following method:

(1) establishment of an epoch difference observation equation according to the present invention, in a wave measurement, a three-dimensional speed is determined by directly using a GNSS phase observation epoch differential and broadcast ephemeris, and a linearized GNSS carrier phase observation equation is shown in Equation (6):

$$[\lambda \Phi_{r,i}^s]_{L1,L2} = (e_{r,i}^s \bullet \delta \xi_{r,i} + c\delta t_{r,i}) - (c\delta t_i^s)_{BRD} + N + p_{r,i}^s + \varepsilon_{r,i}^s \quad (6)$$

where $\lambda$ is the wave length of a carrier frequency (L1 or L2), $\Phi_{r,i}^s$ is a carrier phase observed value at the i-th epoch, i is an epoch number, $e_{r,i}^s$ is a unit vector from a satellite s to a receiver r, $\delta \xi_{r,i}$ is a receiver position correction value, c is the speed of light, $\delta t_{r,i}$ and $\delta t_i^s$ are respectively a receiver clock offset and a satellite clock offset calculated by a broadcast ephemeris, N is an integer ambiguity, $p_{r,i}^s$ is a comprehensive error correction including the satellite orbit correction, the ionosphere correction, the troposphere correction, the phase variation error correction, the relativistic effect correction and an earth rotation effect correction, and $\varepsilon_i$ is other residual error terms and noise;

cycle slips are detected, when the quality of a carrier phase observation is good and has no cycleslip, a common ambiguity N can be eliminated by differencing two consecutive epochs (i, i+1) with Equation (7) as follows:

where, $\Delta$ is a single difference operator, and considering that the initial values of the receiver position at epoch i+1 and epoch i are approximately equal, $e_{r,i+1}^s$ is S approximately equal to $e_{r,i}^s$;

a carrier phase observation epoch differential equation (1) established by use of a broadcast ephemeris can be obtained from Equation (7);

$$[\lambda \Delta \Phi_{r,i}^s]_{L1,L2} = (e_{r,i+1}^s \bullet \Delta \xi_{r,i} + c\Delta \delta t_{r,i}) - (c\Delta \delta t_i^s)_{BRD} + \Delta p_{r,i}^s + \Delta \varepsilon_{r,i}^s \quad (1)$$

$\Delta \xi_{r,i} = \xi \xi_{r,i+1} - \delta \xi_{r,i}$ is the difference of receiver position correction numbers between adjacent epochs (i, i+1), and the estimated parameters in Equation (1) are $\Delta \xi_{r,i}$, and $\Delta \delta t_{r,i}$;

(2) acquisition of speed and displacement information an average speed as shown in Equation (2) can be obtained from Equation (1):

$$V_i = \frac{\Delta \xi_{r,i}}{\Delta t_i} \quad (2)$$

the initial value of the receiver position at the (i+1)th epoch is updated by use of Equation (8);

$$X_{r,i+1}^A = X_{r,i}^A + \Delta \xi_{r,i} \quad (8)$$

where $X_{r,i}^A$ is an initial value of the receiver position at the (i)th epoch. At a starting epoch, the initial value $X_{r,i}^A$ of the receiver position is acquired by use of a broadcast ephemeris based point positioning method, such as a standard point positioning method. At the subsequent epochs, $\Delta \xi_{r,i}$ between adjacent epochs (i, i+1) is calculated based on Equation (1), and then position updating is performed based on Equation (8) so as to obtain an initial value of the receiver position at the subsequent epoch. According to the present invention, the position of the receiver also may be obtained by use of the broadcast ephemeris based point positioning method at each epoch.

The speeds are integrated into a displacement by use of a time domain integration method. Because the speed is affected by sea conditions, geographical locations, signal errors and other noise, speed data contains errors, so the integration method will result in error accumulation, and there is a trend term in displacement data from speed integration. Meanwhile, a water level change of the tide also will cause a trend term in the vertical displacement. In the present invention, a linear trend term is removed from the obtained displacement every 10-20 minutes by use of a sliding window averaging method, and then displacement information of the wave is obtained.

(3) Real-Time High-Precision Wave Measurement

Core wave element information includes the wave height, the wave period and the wave direction and the like. The wave height and the wave period are related to the vertical displacements of a wave, and according to the present invention, wave height and wave period parameters may be extracted by use of a zero-crossing statistical method and a spectrum analysis method from the vertical displacements after a trend term therein is removed; and according to the present invention, a direction spectrum and a frequency spectrum of the wave may be calculated based on the vertical, east-west and north-south speeds, and then the element information such as wave height, wave period and wave direction and the like is obtained. According to the present invention, the wave height and the period may be obtained based on the vertical displacement obtained in real time, for instance, wave parameters may be obtained from the displacement time series by use of the spectrum analysis method, and the calculation formulas are shown in Equation (3)-(5):

$$m_n = \int_0^x f^n S(f) df, n = 0, 1, 2 \quad (3)$$

$$H_{m0} = 4.005 \sqrt{m_0} \quad (4)$$

$$T_z = 2\pi \sqrt{m_0/m_2} \quad (5)$$

Where, f is the frequency, S(f) is the power spectral density, $m_n$ is the n-order spectrum moment, $H_{m0}$ is the significant wave height obtained by the frequency spectrum, and $T_z$ is the average period;

In step 4, since a general wave period is 0.1-30 seconds, low-frequency noise data with a frequency lower than 0.03 Hz is eliminated by use of a high-pass filter. A sampling frequency of the GNSS is above 5 Hz.

A measurement apparatus adopting any one of the above-mentioned GNSS-based real-time high-precision wave measurement methods includes a sea surface carrier such as a wave buoy and the like carrying GNSS, a GNSS receiver or board, an antenna GNSS signal acquisition module, a processor, a memory and a communication module, where the GNSS signal acquisition module is configured to convert positioning electromagnetic wave signals transmitted by a GNSS satellites to the water surface into phases, pseudo-ranges, Doppler frequency shift observations and broadcast ephemerides and then send them to the processor of the wave measurement apparatus, and connected to the processor by means of a serial port; and the processor is configured to run built-in embedded GNSS data processing and wave element inversion software, acquire and process the GNSS observations and the broadcast ephemeris collected by the GNSS signal acquisition module in real time to obtain wave element information, and store the wave element information in the memory, or send the wave element information to the communication module to complete communication between the wave measurement apparatus and a shore or land base station or satellite The wave measurement apparatus such as a wave buoy that carries GNSS carries more than one GNSS antennas.

More than two GNSS antennas are carried when the azimuth angle of the wave measurement apparatus is measured.

More than three GNSS antennas are carried when the attitude of the wave measurement apparatus is measured.

The wave measurement apparatus of the present invention may be a sea surface carrier such as a buoy, a vessel or an unmanned surface vehicle.

The wave measurement apparatus of the present invention includes a sea surface carrier such as a wave buoy and the like, a GNSS signal acquisition module (a GNSS receiver or board, an antenna), a processor, a memory and a communication module. Wherein the GNSS signal acquisition module is configured to capture positioning electromagnetic wave signals transmitted by the GNSS satellite to a water surface, convert the positioning electromagnetic wave signals into phases, pseudo-ranges, Doppler frequency shift observations and broadcast ephemerides and send them to the processor of the wave measurement apparatus, and connected to the processor by means of a serial port or the like; the processor is configured to run embedded data processing software, acquire and process GNSS observations and the broadcast ephemerides collected by the GNSS signal acquisition module in real time to obtain wave element information, and store the wave element information in the memory, or send the wave element information to the communication module; and the communication module is configured to complete communication between the wave measurement apparatus and a shore or land base station or satellite, or complete communication (including Beidou satellite short message communication) between the wave measurement apparatus and a satellite, and connected to the processor or the memory by means of a serial port or the like. The wave measurement apparatus of the present invention is not only applicable to offshore scenarios with signal coverage of communication base stations, but also applicable to far-sea scenarios without signal coverage of communication base stations and implementing communication by use of a satellite, and achieves the real-time, high-precision and low-cost automatic measurement and communication return of wave elements. The wave measurement apparatus according to the present invention saves service costs and communication costs of GNSS precise differential correction services; and according to the present invention, there is no need to store and transmit a large amount of GNSS original observation data, and it only needs to store the calculated wave element information locally in a buoy, and data is read after the buoy is recovered; alternatively, the wave element information is returned through the communication module, thereby greatly reducing the data volume of communication.

The present application has the advantages that: only a low-cost single-frequency GNSS receiver (or board) is required to be carried, a real-time buoy position with at least meter level precision can be obtained based on the GNSS observations and the broadcast ephemerides, a real-time high-precision centimeter-level wave measurement result can be directly obtained based on the broadcast ephemerides freely disseminated and used by GNSS satellites directly without additional precise differential correction services and communication thereof, and wave element information such as the wave height, the corresponding period, the wave direction and the like is stored locally in a buoy or returned by communication; and there is no need to store a large amount of GNSS observation data, thereby saving a storage cost and service and communication costs, overcoming a defect of high cost existing in traditional GNSS-based wave measurement methods, and achieving a low-cost real-time high-precision wave measurement. Because the present invention is applicable to offshore and far-sea scenarios, the ocean monitoring range is expanded.

The present invention is not only applicable to the broadcast ephemerides freely disseminated and used directly based on GNSS satellites, but also applicable to GNSS satellite-based augmentation services, satellite-based differential services, precision positioning services, etc. that may be free in the future.

DETAILED DESCRIPTION OF THE PREFERRED EMBODIMENTS

Figure 1:
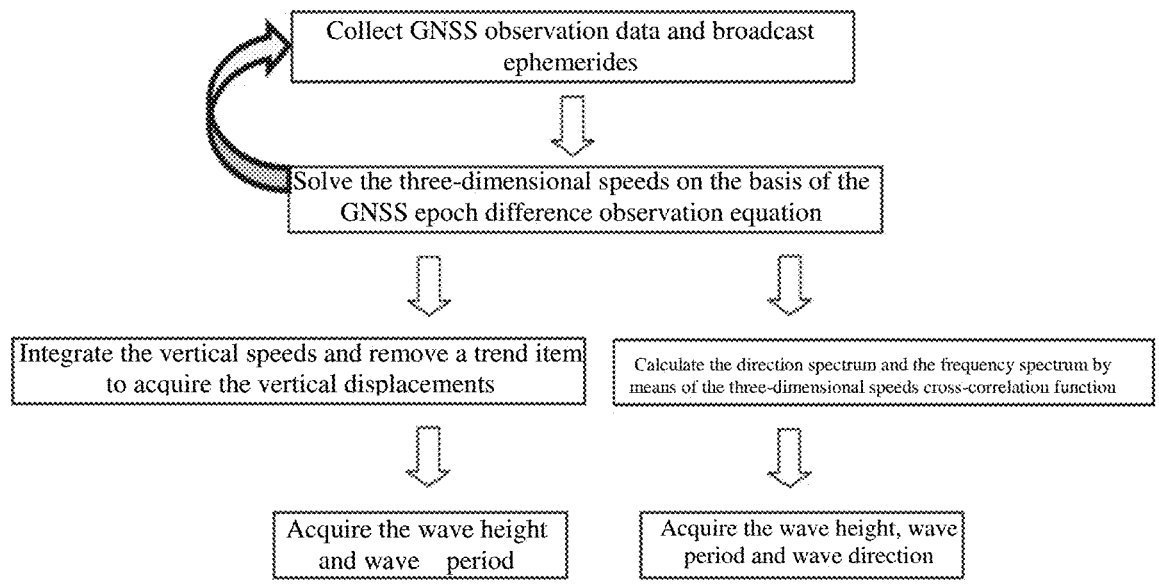
FIG. 1 is a schematic flowchart of a GNSS-based real-time high-precision wave measurement method according to the present invention.
Figure 2:
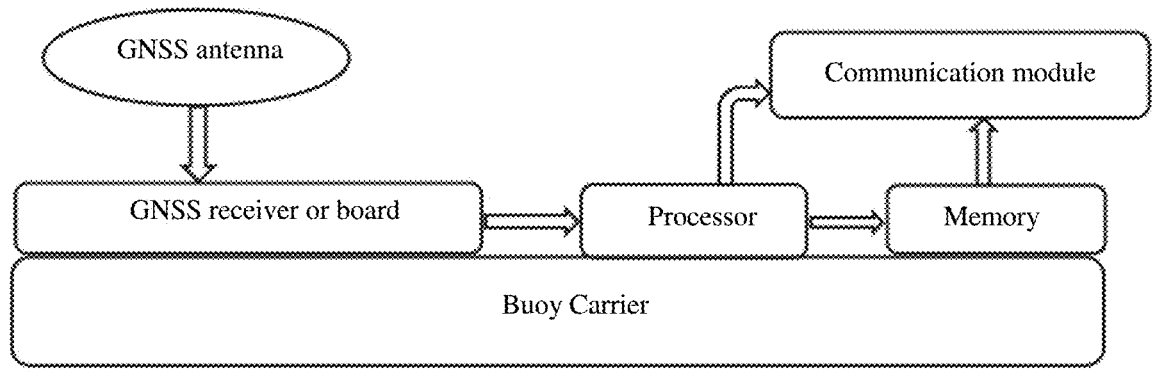
FIG. 2 is a schematic structural diagram of a measurement apparatus for a GNSS-based real-time high-precision wave measurement method according to the present invention.

The embodiments of the invention provide a GNSS-based real-time high-precision wave measurement method, and a wave measurement apparatus using the method is applicable to all water environment scenarios such as lakes, rivers, coastal waters, open sea and the like, particularly applicable to far-sea scenarios lacking precise differential correction services, and has a high precision and a real-time performance.

The wave measurement apparatus of the present invention includes a buoy, a GNSS signal acquisition module (a GNSS receiver or board, an antenna), a processor, a memory, and a communication module, wherein the GNSS signal acquisition module is configured to capture positioning electromagnetic wave signals transmitted by a GNSS satellite to a water surface, convert the positioning electromagnetic wave signals into phases, pseudo-ranges, Doppler frequency shift observations and broadcast ephemerides and send them to the processor of the wave measurement apparatus, and connected to the processor by means of a serial port or the like; the processor is configured to run embedded data processing software, acquire and process the GNSS observed value and the broadcast ephemeris collected by the GNSS signal acquisition module in real time to obtain wave element information, and store the wave element information in the memory, or send the wave element information to the communication module; and the communication module is configured to complete communication between the wave measurement apparatus and a shore or land base station or satellite, or complete communication (including Beidou satellite short message communication) between the wave measurement apparatus and a satellite, and connected to the processor or the memory by means of a serial port or the like. The wave measurement apparatus of the present invention is not only applicable to offshore scenarios with signal coverage of communication base stations, but also applicable to far-sea scenarios without signal coverage of communication base stations and implementing communication by use of a satellite, thereby achieving the real-time, high-precision and low-cost automatic measurement and communication return of wave elements. The wave measurement apparatus of the present invention saves service costs and communication costs of GNSS precise differential correction services; and according to the present invention, there is no need to store and transmit a large amount of GNSS original observation data, it only needs to store the calculated wave element information locally in a buoy, and data is read after the buoy is recovered; alternatively, the wave element information is returned through the communication module, thereby greatly reducing the data volume of communication.

Figure 3:
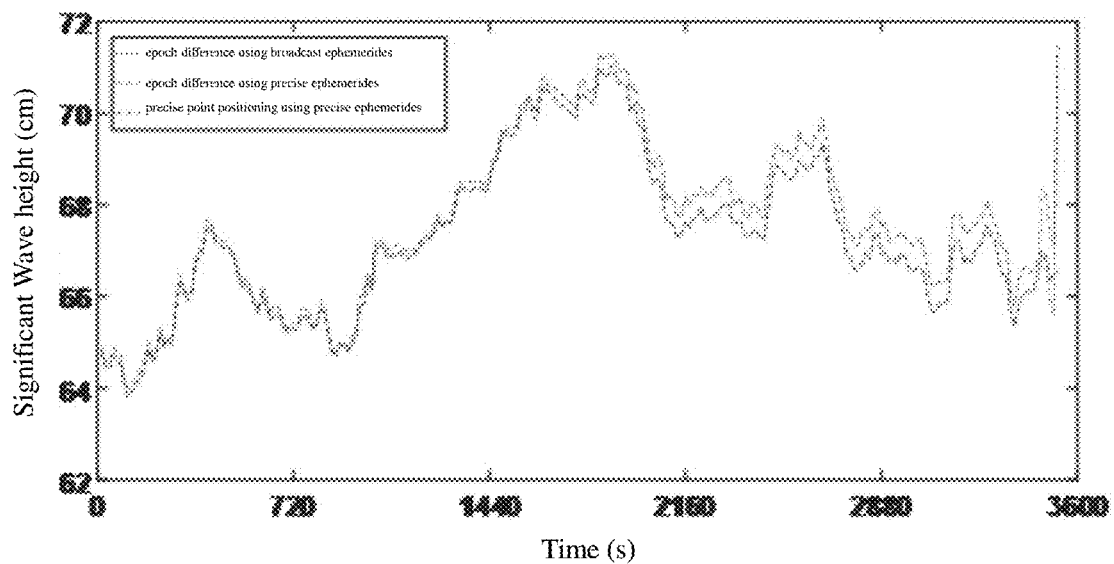
FIG. 3 illustrates the significant wave heights respectively obtained by the wave measurement method of an inter-epoch difference using broadcast ephemeris products according to the present invention, a wave measurement method of an inter-epoch difference using IGS precise ephemeris products and a wave measurement method based on the precise point positioning using the IGS precise ephemeris product, wherein a sampling frequency of the GNSS is above 10 Hz, and a sliding time window is 20 minutes.

The method for measuring a wave by using the wave measurement apparatus specifically includes the following steps:

(1) constituting a wave measurement apparatus by using a sea surface carrier such as a wave buoy that carries a GNSS, collecting high-frequency GNSS positioning electromagnetic wave signals in real time, converting the high-frequency GNSS positioning electromagnetic wave signals into phases, pseudo-ranges, Doppler frequency shift observations and broadcast ephemerides and sending them to a processor of the wave measurement apparatus;

(2) solving horizontal and vertical three-dimensional motion speeds of the sea surface carrier such as a buoy and the like in real time by use of an established phase observation epoch differential equation using the broadcast ephemeris and in consideration with the processing of error terms;

(3) repeating steps (1)-(2) until the initialization of wave measurement is completed; and after a certain amount of data reaches, observing for 20 minutes; and (4) solving the horizontal and vertical three-dimensional motion speeds of the sea surface carrier at each epoch in real time, integrating the vertical motion speed for 20 minutes and removing a trend term caused by the system error and tide by using a sliding time window method to obtain time-dependent vertical displacement change information, and then solving wave element information such as the wave height and wave period, where since a general wave period is 0.1-30 seconds, in an embodiment of the present invention, low-frequency noise data with a frequency lower than 0.03 Hz is eliminated by use of a high-pass filter; and wave element information such as the wave height and the period is respectively calculated according to the method provided by the present invention and by use of Equations 1-8; (As shown in FIGS. 3 and 4) and (5) locally storing the wave element information during these sliding time window periods, that is calculated in real time, in a buoy, or periodically returning the wave element information by means of real-time communication;

As can be seen in FIG. 3, the wave measurement method of phase inter-epoch difference using broadcast ephemeris products proposed by the present invention, no precise differential correction service product is needed, and the wave height measurement precision of the method reaches the wave height measurement precision using the precise ephemeris products.

Figure 4:
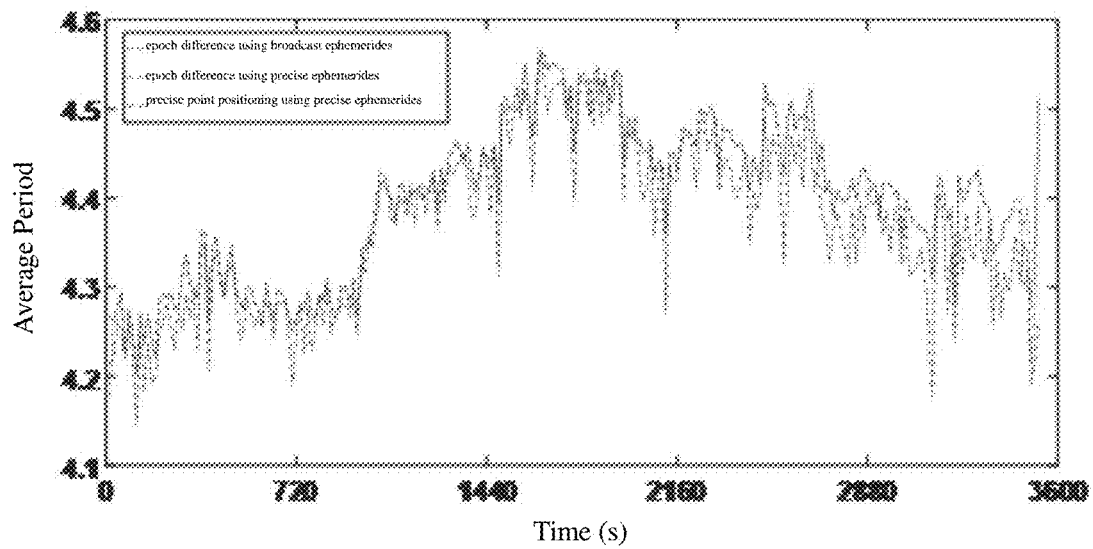
FIG. 4 illustrates the average wave periods respectively obtained by the wave measurement method of an inter-epoch difference using broadcast ephemeris products according to the present invention, a wave measurement method of an inter-epoch difference using IGS precise ephemeris products and a wave measurement method based on the precise point positioning using the IGS precise ephemeris products, where a sampling frequency of the GNSS is above 10 Hz, and a sliding time window is 20 minutes.

As can be seen in FIG. 4, the wave measurement method of phase inter-epoch difference using broadcast ephemeris products proposed by the present invention, no precise differential correction service product is needed, and the average wave period measurement precision of the method reaches the average wave period measurement precision using the precise ephemeris products.

FIGS. 3 and 4 compare the wave measurement method of the phase inter-epoch difference using broadcast ephemeris products, the wave measurement method of inter-epoch difference using IGS precise ephemeris products and the wave measurement method of the precise point positioning using the IGS precise ephemeris products, it can be seen that differences among results of the three are very small, which verifies that high-precision wave element information may be obtained according to the present invention.

The invention claimed is:

1. A GNSS-based real-time high-precision wave measurement method, the method comprising the following steps:
   (1) constituting a wave measurement apparatus by using a sea surface carrier collecting high-frequency GNSS positioning electromagnetic wave signals in real time, converting the high-frequency GNSS positioning electromagnetic wave signals into phases, pseudo-ranges, Doppler frequency shift observations and broadcast ephemerides and sending them to a processor of the wave measurement apparatus;
   (2) solving horizontal and vertical three-dimensional motion speeds of the sea surface carrier in real time by use of an established phase observation epoch differential equation using the broadcast ephemeris and in consideration with the processing of error terms;
   (3) repeating steps (1)-(2) for 10 to 20 minutes to reach a certain amount of data until the initialization of wave measurement is completed;
   (4) solving the horizontal and vertical three-dimensional motion speeds of the sea surface carrier at each epoch in real time, repeating steps (1)-(3) by using a sliding time window method to integrate the vertical motion speed for 10-30 minutes and remove a trend term caused by the system error and tide so as to obtain time-dependent vertical displacement change information, and then solving wave element information; alternatively, calculating the cross spectrum by means of the cross-correlation function through solved vertical, east-west and north-south speeds of the wave measurement apparatus, followed by solving the direction spectrum and the frequency spectrum by means of the direction spectrum analysis method, and then solving the wave height, the period and the wave direction; and
   (5) locally storing the wave element information during these sliding time window periods, that is calculated in real time, in a buoy, or periodically returning the wave element information by means of real-time communication.

2. The GNSS-based real-time high-precision wave measurement method according to claim 1, wherein in step (2) of solving three-dimensional speeds by use of an established phase observation epoch differential equation using the broadcast ephemeris, a carrier phase observation epoch differential equation using the broadcast ephemeris is shown in Equation (1), and an equation for solving the three-dimensional speeds is shown in Equation (2):

$$[\lambda \Delta \Phi_{r,i}^S]_{L1,L2} = (e_{r,i+1}^S \cdot \Delta \xi_{r,i} + c\Delta \delta t_{r,i}) - (c\Delta \delta t_i^S)_{BRD} + \Delta p_{r,i}^S + \Delta \varepsilon_{r,i}^S \quad (1)$$

$$V_i = \frac{\Delta \xi_{r,i}}{\Delta t_i} \quad (2)$$

where, in Equation (1), $\lambda$ is the wave length of the carrier L1 or L2 frequency, $\Delta \Phi_{r,i}^s$ is a difference of carrier phase observed values between adjacent epochs (i, i+1) from a satellite s to a receiver r, and i is an epoch number; $e_{r,i+1}^s$ is a unit vector from the satellite s to the receiver r at the (i+1)th epoch, and $\Delta \xi_{r,i}$ is a difference of receiver position correction between adjacent epochs (i, i+1); c is the speed of light, and $\Delta \delta t_{r,i}$ and $\delta t_i^s$ are respectively a relative receiver clock offset and a satellite clock offset calculated by a broadcast ephemeris between adjacent epochs (i, i+1); $\Delta p_{r,i}^s$ is a comprehensive error correction between adjacent epochs (i, i+1), including a satellite orbit correction, an ionosphere correction, a troposphere correction, a phase variation error correction, a relativistic effect correction and an earth rotation effect correction, where the satellite orbit correction is calculated by a broadcast ephemeris, the ionosphere correction is calculated by a dual-frequency ionospheric-free combined first-order term or an ionospheric model disseminated by a broadcast ephemeris, the troposphere correction is calculated by actually measured or numerically modeled meteorological data and a mapping function, and the phase variation error correction, the relativistic effect correction and the earth rotation effect correction are calculated by corresponding models; $\Delta \varepsilon_{r,i}^s$ is other residual error terms and noise; estimated parameters in Equation (1) are $\Delta \xi_{r,i}$ and $\Delta \delta t_{r,i}$ in Equation (2), $V_i$ is a three-dimensional speed, $\Delta \xi_{r,i}$ is a difference of receiver position correction between adjacent epochs (i, i+1), and $\Delta t_i$ is a time interval between adjacent epochs; and when frequent cycle slips occur in GNSS phase observed values, the three-dimensional speeds of the wave measurement apparatus are calculated by using the Doppler frequency shift observations to supplement the time series of the three-dimensional speeds.

3. The GNSS-based real-time high-precision wave measurement method according to claim 1, wherein the wave element information in step (4) can be obtained on the basis of the vertical displacement after removing a trend term so as to obtain the wave heights and corresponding periods thereof, specifically including a maximum wave height and a corresponding period thereof, a one-tenth wave height and a corresponding period thereof, an significant wave height and a corresponding period thereof, and an average wave height and a corresponding period thereof; and the wave element information in step (4) also can be obtained by solving a direction spectrum and a frequency spectrum of the wave based on vertical, east-west and north-south speeds and then solving the wave element information; and the wave element information can be inversed by using a spectrum analyzing method according to formulas as follows:

$$m_n = \int_0^\infty f^n S(f) df, n = 0, 1, 2 \quad (3)$$

-continued $$H_{m0} = 4.005\sqrt{m_0} \quad (4)$$

$$T_z = 2\pi\sqrt{m_0/m_2} \quad (5)$$

where, f is the frequency, S(f) is the power spectral density, $m_n$ is the n-order spectrum moment, $H_{m0}$ is the significant wave height obtained by the frequency spectrum, and $T_Z$ is the average period;

a three-dimensional speed of a motion carrier is acquired by use of the GNSS phase observation epoch differential equation and the GNSS broadcast ephemeris, a time-dependent vertical displacement change is obtained by integrating the vertical speed and removing a trend term, and then high-precision wave element information is inversed in real time according to the vertical displacement; wave element information is calculated by vertical, east-west and north-south speeds measured by GNSS, and then high-precision element information is inversed in real time; and the above process is specifically divided into the following three parts, described as the following method:

(1) establishment of an epoch differential observation equation in a wave measurement, a three-dimensional speed is determined by directly using an GNSS phase observation epoch differential and broadcast ephemeris, and a linearized GNSS carrier phase observation equation is shown in Equation (6):

$$[\lambda\Phi_{r,i}^s]_{L1,L2} = (e_{r,i}^s \bullet \xi_{r,i} + c\delta t_{r,i}) - (c\delta t_i^s)_{BRD} + \Delta p_{r,i}^s + \Delta\varepsilon_r, \quad (6)$$

where λ is the wave length of a carrier L1 or L2 frequency, $\Phi_{r,i}^s$ is a carrier phase observed value at the i-th epoch, i is an epoch number, $e_{r,i}^s$ is a unit vector from a satellite s to a receiver r, $\Delta\xi_{r,i}$ a receiver position correction value, c is the speed of light, $\delta t_{r,i}$ and $\Delta t_i^s$ are respectively a receiver clock offset and a satellite clock offset calculated by a broadcast ephemeris, N is an integer ambiguity, $p_{r,i}^s$ is a comprehensive error correction including the satellite orbit correction, the ionosphere correction, the troposphere correction, the phase variation error correction, the relativistic effect correction and the earth rotation effect correction, and $\varepsilon_i$ is other residual error terms and noise;

cycle slips are detected, when the quality of carrier phase observations is good and has no cycle slip, a common ambiguity N can be eliminated by differencing two consecutive epochs (i, i+1) with Equation (7) as follows:

$$[\lambda\Delta\Phi_{r,i}^S]_{L1,L2} = [\lambda\Phi_{r,i+1}^S]_{L1,L2} - [\lambda\Phi_{r,i}^S]_{L1,L2} \quad (7)$$
$$= (e_{r,i+1}^S \cdot (\delta\xi_{r,i-1} - \delta\xi_{r,i}) + (e_{r,i+1}^S - e_{r,i}^S) \cdot \delta\xi_{r,i} + c\Delta\delta t_{r,i}) - (c\Delta\delta t_i^S)_{BRD} + \Delta p_{r,i}^S + \Delta\varepsilon_i$$
$$\approx (e_{r,i+1}^S \cdot (\delta\xi_{r,i-1} - \delta\xi_{r,1}) + c\Delta\delta t_{r,i}) - (c\Delta\delta t_i^S)_{BRD} + \Delta p_{r,i}^S + \Delta\varepsilon_i$$

where, Δ is a single difference operator, and considering that the initial values of the receiver position at epoch i+1 and epoch i are approximately equal, $e_{r,i+1}^s$ is approximately equal to $e_{r,i}^s$;

a carrier phase observation epoch differential equation (1) established by use of a broadcast ephemeris can be obtained from Equation (7);

$$[\lambda\Delta\Phi_{r,i}^s]_{L1,L2} = (e_{r,i+1}^s \bullet \Delta\xi_{r,i} + c\Delta\delta t_{r,i}) - (c\Delta\delta t_i^s)_{BRD} + \Delta p_{r,i}^s + \Delta\varepsilon_{r,i}^s \quad (1)$$

where, $\Delta\xi_{r,i} = \delta\xi_{r,i+1} - \Delta\xi_{r,i}$ is the difference of receiver position correction values between adjacent epochs (i, i+1), and the estimated parameters in Equation (1) are $\Delta\xi_{r,i}$ and $\Delta\delta t_{r,i}$;

(2) acquisition of speed and displacement information an average speed as shown in Equation (2) can be obtained from Equation (1):

$$V_i = \frac{\Delta\xi_{r,i}}{\Delta t_i} \quad (2)$$

the initial value of the receiver position at the (i+1)th epoch is updated by use of Equation (8);

$$X_{r,i+1}^A = X_{r,i}^A + \Delta\xi_{r,i} \quad (8)$$

where $X_{r,i}^A$ is an initial value of the receiver position at the (i)th epoch, at a starting epoch, the initial value $X_{r,i}^A$ of the receiver position is acquired by use of a broadcast ephemeris based point positioning method, and at the subsequent epochs, $\Delta\xi_{r,i}$ between adjacent epochs (i, i+1) is calculated based on Equation (1), and then position updating is performed based on Equation (8) so as to obtain the initial value of the receiver position at the subsequent epoch, alternatively, the position of the receiver is obtained by use of the broadcast ephemeris based point positioning method at each epoch; and the speeds are integrated into a displacement by use of a time domain integration method; and because the speed is affected by sea conditions, geographical locations, signal errors and other noise, speed data contains errors, so the integration method will result in error accumulation, and there is a trend term in displacement data from speed integration; and a water level change of the tide also will cause a trend term in the vertical displacement; and a linear trend term is removed from the obtained displacement every 10-20 minutes by use of a sliding window averaging method, and then displacement information of the wave is obtained;

(3) real-time high-precision wave measurement core wave element information includes the wave height, wave period and wave direction, the wave height and the wave period are related to the vertical displacements of a wave, and wave height and wave period parameters are extracted by use of a zero-crossing statistical method and a spectrum analysis method from the vertical displacements after a trend term therein is removed; a direction spectrum and a frequency spectrum of the wave are calculated based on the vertical, east-west and north-south speeds, then the element information is solved; and the wave height and the period are obtained based on the vertical displacement obtained in real time, and wave parameters are obtained from the displacement time series by use of the spectrum analysis method, the calculation formulas are shown in Equation (3)-(5):

$$m_n = \int_0^\infty f^n S(f) df, n = 0, 1, 2 \quad (3)$$

$$H_{m0} = 4.005\sqrt{m_0} \quad (4)$$

$$T_z = 2\pi\sqrt{m_0/m_2} \quad (5)$$

where, f is the frequency, S(f) is the power spectral density, $m_n$ is the n-order spectrum moment, $H_{m0}$ is the significant wave height obtained by the frequency spectrum, and $T_Z$ is the average period.

4. The GNSS-based real-time high-precision wave measurement method according to claim 1, wherein in step 4, since a general wave period is 0.1-30 seconds, low-frequency noise data with a frequency lower than 0.03 Hz is eliminated by use of a high-pass filter.

5. The GNSS-based real-time high-precision wave measurement method according to claim 1, wherein a sampling frequency of the GNSS is above 5 Hz.

6. A measurement apparatus for the GNSS-based real-time high-precision wave measurement method, wherein the measurement apparatus employs the GNSS-based real-time high-precision wave measurement method according to claim 1, and comprises a sea surface carrier carrying GNSS, a GNSS receiver or board, an antenna, GNSS signal acquisition module, a processor, a memory and a communication module, where the GNSS signal acquisition module is configured to convert positioning electromagnetic wave signals transmitted by GNSS satellites to the water surface into the phases, pseudo-ranges, Doppler frequency shift observations and the broadcast ephemerides and then send them to the processor of the wave measurement apparatus, and connected to the processor by means of a serial port; and the processor is configured to run built-in embedded GNSS data processing and wave element inversion software, acquire and process the GNSS observations and the broadcast ephemeris collected by the GNSS signal acquisition module in real time to obtain wave element information, and store the wave element information in the memory, or send the wave element information to the communication module to complete communication between the wave measurement apparatus and a shore or land base station or satellite.

7. The measurement apparatus for a GNSS-based real-time high-precision wave measurement method according to claim 6, wherein the sea surface carrier that carries GNSS carries more than one GNSS antennas.

8. The measurement apparatus for a GNSS-based real-time high-precision wave measurement method according to claim 7, wherein more than two GNSS antennas are carried when the azimuth angle of the wave measurement apparatus is measured.

9. The measurement apparatus for the GNSS-based real-time high-precision wave measurement method according to claim 7, wherein more than three GNSS antennas are carried when the attitude of the wave measurement apparatus is measured.

10. The measurement apparatus for the GNSS-based real-time high-precision wave measurement method according to claim 6, wherein the wave measurement apparatus is a sea surface carrier.

* * * * *